US009098581B2

(12) United States Patent
Yacoub et al.

(10) Patent No.: US 9,098,581 B2
(45) Date of Patent: Aug. 4, 2015

(54) METHOD FOR FINDING TEXT READING ORDER IN A DOCUMENT

(75) Inventors: Sherif Yacoub, Barcelona (ES); Daniel Ortega, Barcelona (ES); Paolo Faraboschi, Barcelona (ES); Jose Abad Peiro, Barcelona (ES)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 2246 days.

(21) Appl. No.: 11/995,650

(22) PCT Filed: Jul. 27, 2005

(86) PCT No.: PCT/US2005/026498
§ 371 (c)(1),
(2), (4) Date: Jan. 14, 2008

(87) PCT Pub. No.: WO2007/018501
PCT Pub. Date: Feb. 15, 2007

(65) Prior Publication Data
US 2010/0198827 A1    Aug. 5, 2010

(51) Int. Cl.
*G06F 17/30* (2006.01)
*G06K 9/00* (2006.01)
*G06F 17/27* (2006.01)

(52) U.S. Cl.
CPC ...... *G06F 17/30864* (2013.01); *G06K 9/00463* (2013.01); *G06F 17/27* (2013.01)

(58) Field of Classification Search
CPC ...................... G06K 9/00463; G06F 17/30864

USPC ............................ 707/739; 715/204; 382/173
See application file for complete search history.

(56) References Cited

U.S. PATENT DOCUMENTS

| 5,159,667 A | 10/1992 | Borrey |
| 5,185,813 A | 2/1993 | Tsujimoto |
| 5,555,362 A | 9/1996 | Yamashita et al. |
| 5,848,184 A | 12/1998 | Taylor et al. |
| 5,907,631 A | 5/1999 | Saitoh |
| 5,956,468 A * | 9/1999 | Ancin ............................ 382/164 |
| 6,009,196 A | 12/1999 | Mahoney |
| 6,562,077 B2 | 5/2003 | Bobrow et al. |
| 6,970,602 B1 | 11/2005 | Smith et al. |
| 2003/0208502 A1 | 11/2003 | Lin |
| 2006/0080309 A1 | 4/2006 | Yacoub et al. |
| 2006/0087683 A1 | 4/2006 | King |

(Continued)

FOREIGN PATENT DOCUMENTS

WO    WO-02/03315    1/2002

OTHER PUBLICATIONS

Baird, "Digital Libraries and Document Image Analysis," Document Analysis and Recognition, Proceedings, Seventh International Conference on Aug. 3-6, 2003, pp. 2-14.

(Continued)

*Primary Examiner* — Shahid Alam
(74) *Attorney, Agent, or Firm* — Van Cott, Bagley, Cornwall & McCarthy (57) ABSTRACT

Example methods for finding a text reading order in a document are described in which text zones are determined, the text zones are clustered using semantic measure and correlation and a reading order is found within each of the clusters.

17 Claims, 5 Drawing Sheets

(56) References Cited

U.S. PATENT DOCUMENTS

2006/0104511 A1    5/2006    Guo et al.
2007/0027749 A1    2/2007    Peiro et al.

OTHER PUBLICATIONS

Hadjar et al., "Xed: A New Tool for Extracting Hidden Structures From Electronic Documents," Document Image Analysis for Libraries, Proceedings, First International Workshop, Jan. 23-24, 2004, pp. 212-224.
A. McCallum, "Bow: A Toolkit for Statistical Language Modeling, Text Retrieval, Classification and Clustering," Sep. 12, 1998, <http://www.cs.cmu.edu/~mccallum/bow/>.
Aiello et al., "Document Understanding for a Broad Class of Documents," International Journal of Document Analysis and Recognition 5(1), 2000; 1-16.
Allen et al., "Maintaining Knowledge About Temporal Intervals," Communications of the ACM, 1983, 26(11), 832-843.
Broder, Andrei Z., et al, "Syntactic clustering of the web," Computer Networks and ISDN Systems, 1997, 29.8, pp. 1157-1166.
Cohen, William W. "Learning to classify English text with ILP methods," Advances in inductive logic programming, 1995, 32, pp. 124-143.
International Preliminary Report on Patentability received in PCT Application No. PCT/US2005/026498, Feb. 7, 2008, 8 pages.
International Search Report & Written Opinion received in PCT Application No. PCT/US2005/026498, Nov. 17, 2005, 13 pages.
Masataki et al., "Variable-order N-gram Generation by Word-class Splitting & Consecutive Word Grouping," ICASSP-96, Conference—Acoustics, Speech, and Signal Processing, 1996, pp, 188-191.
R. Haralick, "Document Image Understanding: Geometric and Logical Layout," 1994 IEEE Computer Society Conference on Computer Vision & Pattern Recognition, 1994, pp. 385-390.
Toutanova, Kristina, et al. "Text classification in a hierarchical mixture model for small training sets," Proceedings of the tenth international conference on information and knowledge management, ACM, 2001, pp. 105-113.
Tsujimoto et al, "Understanding Multi-Articled Documents," 10th International Conference on Pattern Recognition, 1990 Proceedings, 1990, pp. 551-556.
Wikipedia, "Machine learning," Jun. 13, 2005, <http://en.wikipedia.org/w/index.php?title=Machine_learning&oldid=16112221>.
Yang et al., "A study of approaches to hypertext categorization," Journal of Intelligent Information Systems, 2002, 18.2-3, pp. 219-241.
Yang, Yiming. "An evaluation of statistical approaches to text categorization." Information retrieval, 1999, 1.1-2, pp. 69-90.

* cited by examiner

| Zone ID | Zone ID | Correlation Factor |
|---|---|---|
| 22 | 21 | 0.071736 |
| 22 | 20 | 0.185435 |
| 21 | 17 | 0.067589 |
| 19 | 17 | 0.064064 |
| 19 | 18 | 0.099200 |
| 19 | 15 | 0.123170 |
| 17 | 21 | 0.067589 |
| 17 | 15 | 0.074880 |
| 17 | 16 | 0.097081 |
| 11 | 6 | 0.046785 |
| 7 | 9 | 0.099143 |
| 8 | 9 | 0.099143 |

A: rows 1–9; B: row 10; C: rows 11–12

METHOD FOR FINDING TEXT READING ORDER IN A DOCUMENT

This application is the National Phase of PCT/US2005/026498, filed Jul. 27, 2005. The contents of the foregoing application is incorporated by reference in its entirety.

The present invention relates to a method for finding text reading order in a document. The method finds particular although not exclusive application in the conversion of paper based documents into digital form, especially documents such as magazines or newspapers where the page layout may be relatively complex and where there may be more than one article on each page.

In large-volume document analysis and understanding systems, paper documents are scanned, processed, and archived. Many components are involved in such a system: page segmentation and region finding, text recognition, semantic analysis of the content, advertisement finding, article finding, identification of headers, footers, page numbers, captions, titles, authors, section, etc.

Within a single page, multiple text regions (zones or blocks) are identified in the document analysis process. A key challenge is to find out automatically how the text regions are related to one another and identifying the reading order. The reading order defines how a person would read those text blocks and is a key in the automated extraction of articles and related text from a page. Existing methods use layout and geometric information in addition to language rules to extract the reading order in a document. These methods do not work well on pages with large number of text zones, nor on pages having more than one article.

In a typical prior art system, paper documents are scanned and converted into raster electronic versions (i.e. digital high-resolution images). The raster document images are then converted into another electronic version that is meaningful to machines as it is to human beings. In such a process, a set of analysis and recognition processes must be performed.

The document analysis and recognition process include components for:
  Image preprocessing—improving the raster image for acceptable presentation quality.
  Segmentation—analysis of the document to identify various zones (regions or bounding boxes).
  Optical Character Recognition (OCR)—recognition of text within segmented zones.
  Document structure analysis: table of content identification, beginning and end of articles, reference detection, etc.
  Semantic analysis: titles, authors, headers, footers, captions, page numbers, footnotes, etc.
  Advertisement detection.

According to the present invention a method for find text reading order in a document is characterised by those features set out in the characterising portion of the independent claim or independent claims.

The invention also extends to a computer program for carrying out the method for example as embodied in a series of electrical signals transmitted across a computer network. This includes, but is not restricted to, a computer program for carrying out the method of the present invention as downloaded from a server across a network such as the Internet. The invention further extends to computer readable media which carry such a computer program.

BRIEF DESCRIPTION OF DRAWINGS

The invention may be carried into practice in a number of ways, and one specific embodiment will now be described, by way of example, with reference to the accompanying drawings, in which.

DETAILED DESCRIPTION

Figure 1:
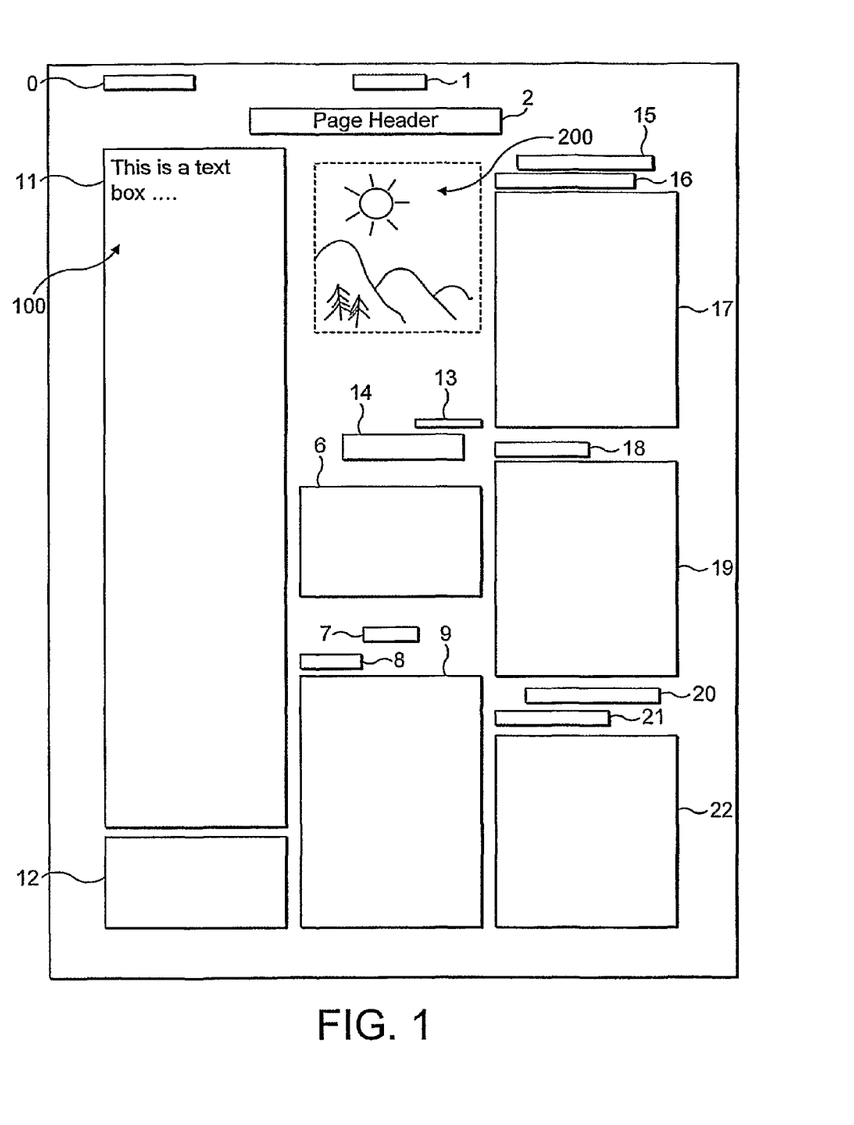
FIG. 1 illustrates a page of text, for example from a magazine or newspaper, with the text boxes marked.

Turning first to FIG. 1, there is shown an exemplary page, for example from a newspaper or a magazine, which is to be processed according to the embodiment of the invention. The page includes a variety of different areas, including a picture 200, a page header 2, a title 1, and a variety of other areas which contain text 100. To simplify the diagram, most of the text within the text areas has been omitted.

The first stage in the procedure is to identify and label each of the areas which are found on the page. Included within this procedure are the steps of digitising the page as an image, carrying out preprocessing to improve image quality, identifying text and image areas and labelling them accordingly, and carrying our Optical Character Recognition (OCR) on the text within each of the identified text zones. All of these steps may be carried out using procedures which are in themselves well known to a skilled person in the field. This stage is shown schematically by the box 39 in FIG. 2.

Figure 2:
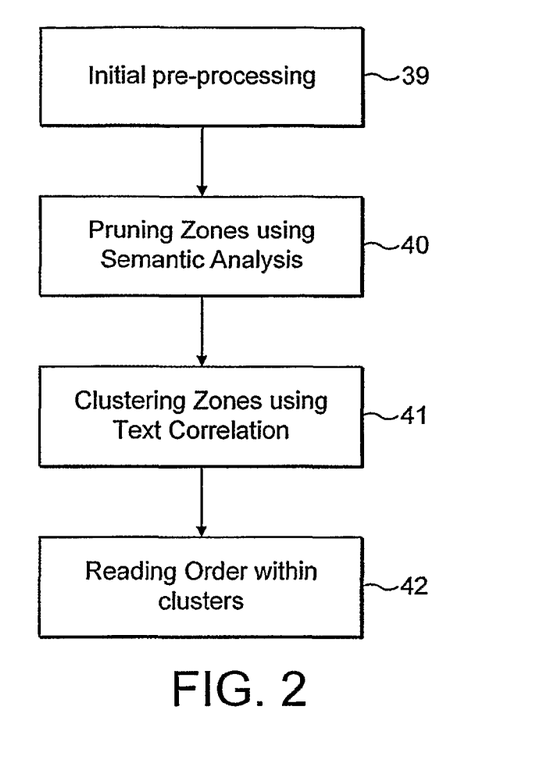
FIG. 2 illustrates schematically the operation of an embodiment of the invention, for finding a reading order for the page of text shown in FIG. 1.

As illustrated by box 40 of FIG. 2, the next stage in the process is to prune the zones which have been identified as text zones using semantic analysis. During this part of the process, zones which have been identified as images, such as the zone 200 in FIG. 1, are ignored. Zone semantics for a magazine page might typically include specific rules for identifying all or some of the following zones: title, section, header, footer, date, footnote, page number, caption, body text, advertisement and so on. Rules to determine these specific zones may include, for example, position on page, size of zone, text size, physical relationship with other zones and semantic analysis of the actual text and/or punctuation. One specific implementation is described in the U.S. patent application Ser. No. 11/189,930, entitled "Advertisement Detection," filed Jul. 27, 2005, the contents of which are incorporated by reference.

Applying semantic analysis to the zones of FIG. 1 allows a number of the text zones to be pruned (in addition of course to the image zone 200). Specifically, zone 0 may be pruned as it represents a date, zone 1 is a header, zone 2 is a page or section header, zone 12 is a footer, and zones 13 and 14 are captions. As a result of pruning these zones, we arrive at the layout shown in FIG. 3. In this layout, all of the text zones are expected to be of interest, and to be included within the final reading order for the page.

Figure 3:
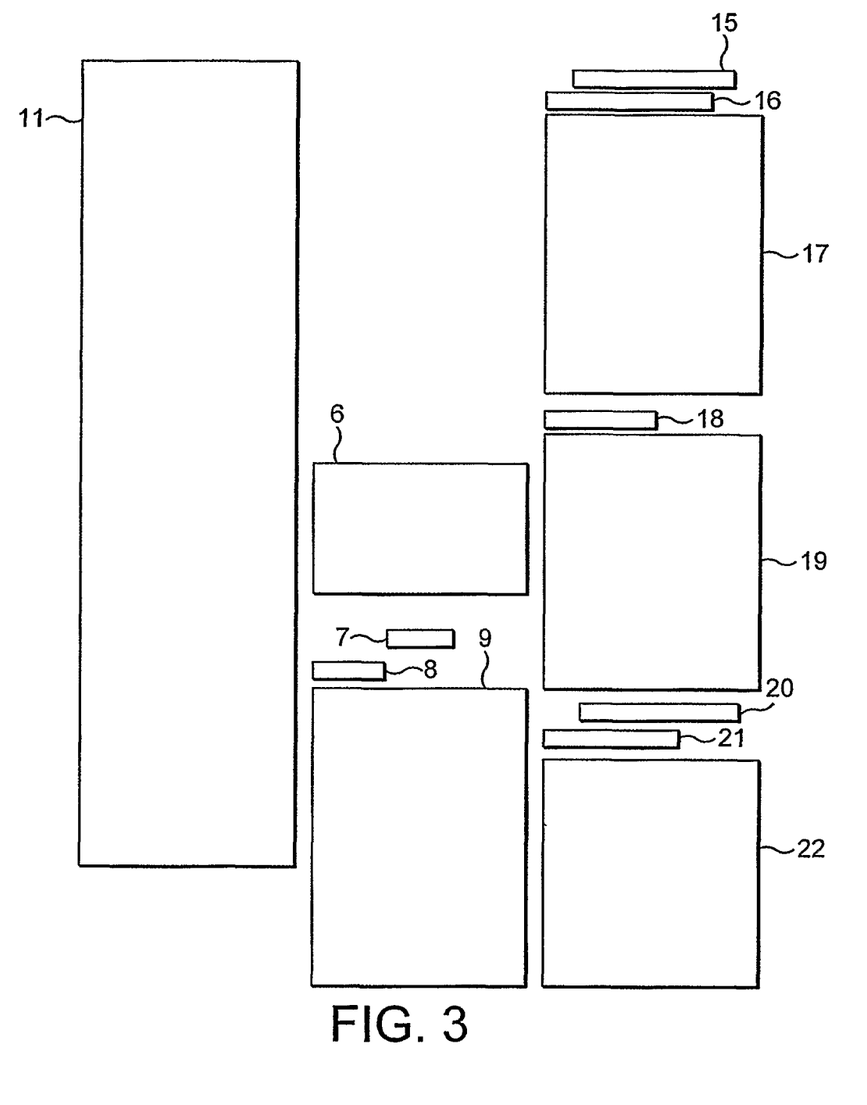
FIG. 3 shows the text boxes after pruning zones based on semantics.

Even with the reduced number of zones shown in FIG. 3, the task of determining a preferred reading order may be difficult or impossible to achieve using conventional methods. This may particularly be the case where there remain a large number of zones and/or where the page contains multiple articles each of which a human reader would recognise as being a single semantic entity.

Rather than attempting to process all of the identified zones at once, the present invention now proceeds to a clustering step, as indicated at box 41 of FIG. 2. The task here is to divide the zones up into clusters, with the zones within each cluster being semantically linked with one another. The aim is to ensure, so far as possible, that each cluster represents a single article on the page.

In order to generate clusters, we first analyse each zone using some appropriate semantic measure. We then cross correlate each zone against every other zone, to determine a zone correlation factor. Typically, the zone correlation factor will be a measure of the extent to which the text in one zone has similarities with the text in another zone.

The measures which are used for this process may be selected by the user according to the application in hand. The measures for an individual text block might include, for example, the number of characters, the number of strings, the number of spaces, the average word length, the presence or absence of particular words or classes of words, the type and density of punctuation and so on. Other measures of course may occur to the skilled man and may be used as appropriate. The individual measures for two separate zones will then be compared according to any convenient metric such as, for example, least squares, and the correlation factor between those zones determined.

In one particular embodiment, the similarity between a first zone and a second zone may be determined according to the text classification measures described by McCallum in "*Bow: A toolkit for statistical language modelling, text retrieval, classification and clustering*." http://www.cs.cmu.edu/~mccallum/bow, 1996.

Figure 4:
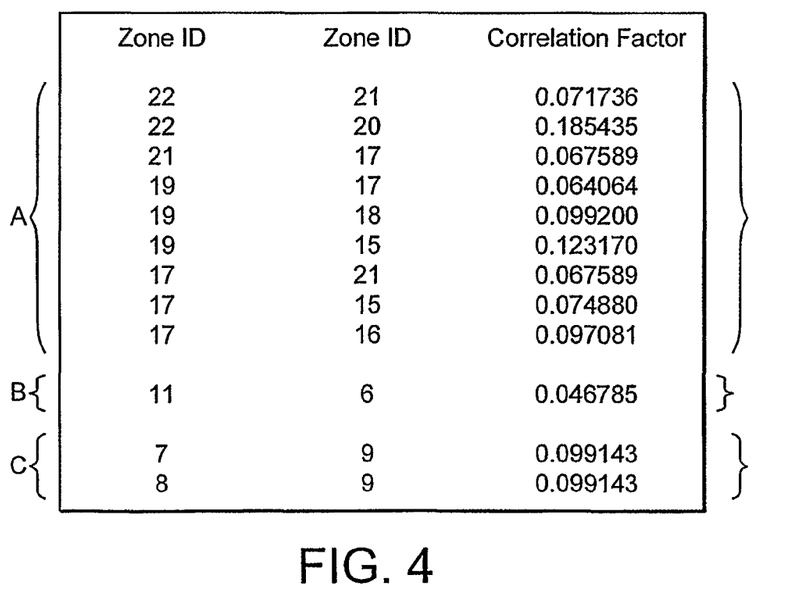
FIG. 4 shows the correlation factors between the zones identified in FIG. 3.

The result of the correlation procedure will be a table, such as is illustrated in FIG. 4, which shows the extent of similarity between every zone within the set and every other zone. This table is then used to group the zones into one or more discrete clusters.

One convenient way of carrying out the clustering procedure is to define a minimum correlation threshold below which two zones are to be considered uncorrelated. In the present example, the cut-off has been taken at 0.04, and pairs of zones which have a correlation below that are ignored for this purpose and are not shown in FIG. 4. The cut-off value may be chosen by the user according to the application in hand. The remaining pairs are clustered using a simple zone-growing technique.

First, a single zone such as zone 22 is chosen to start a cluster. The cluster is then grown by adding to it all other zones, (zones 21 and 20 in this example) which have a correlation greater than the cut-off. The procedure is then repeated for the newly added zones. In this example, the addition of zone 21 automatically brings in zone 17 since 21 is correlated with 17 by a factor above the cut-off value. The addition of zone 17 then brings in zones 15 and 16, and so on. The procedure is repeated until no zone within the growing cluster is found to have a correlation greater than the cut-off value with any zone which is outside the cluster. In the present example, this generates a first cluster A, which includes zones 15 16 17 18 19 20 21 and 22.

Next, another unallocated zone is chosen (zone 11 in this example) to form the start of a second cluster. As will be seen from FIG. 4, only zone 6 has a sufficiently high correlation with zone 11 to be included in its cluster. Zone 6 does not itself have a correlation above the cut-off value with any zone other than 11. Hence, the second cluster, designated B, consists simply of zones 11 and 6.

Next, zone 7 is chosen as the start of a third cluster. Zone 7 is correlated with zone 9 which is itself correlated with zone 8. There are no other zones remaining. So the final cluster, designated C, consists of the zones 7, 8 and 9.

Figure 5:
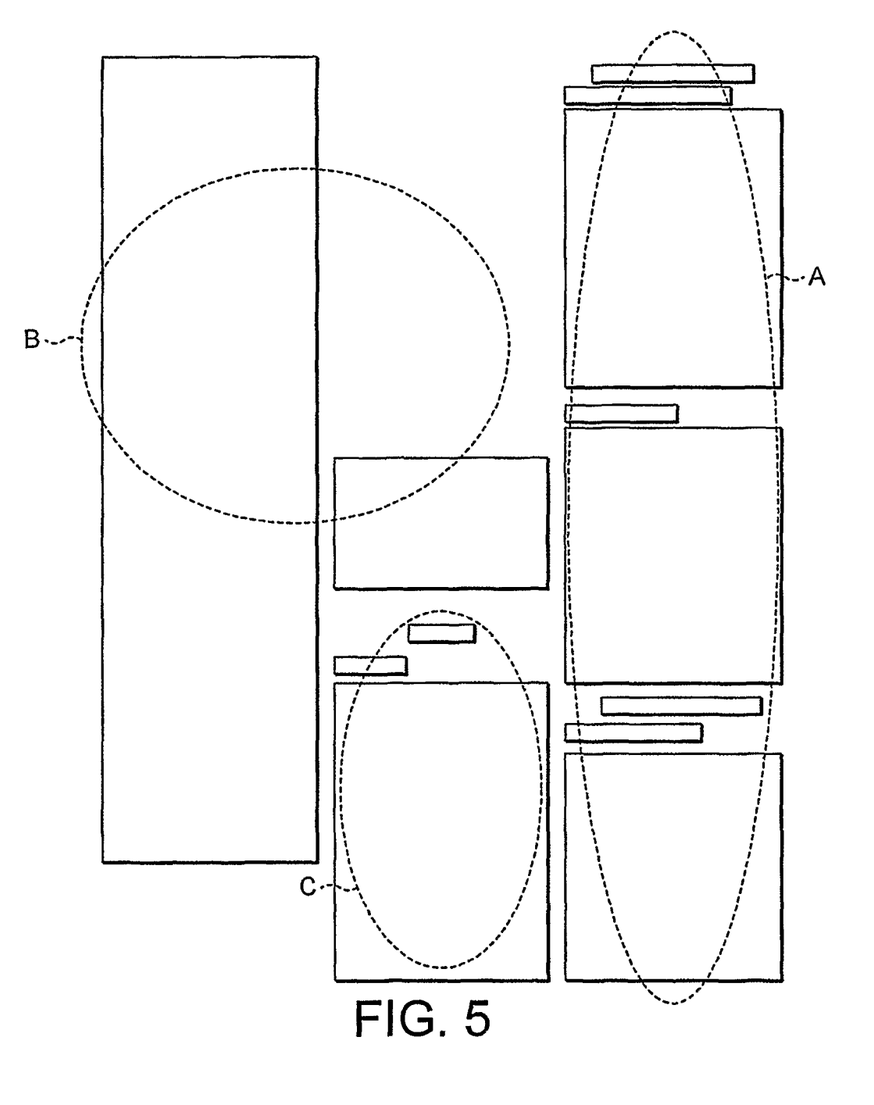
FIG. 5 shows the zones after clustering.

The final zone assignments are shown schematically in FIG. 5.

The final step in the procedure, as indicated by the box 42 in FIG. 2, is to determine the reading order within each of the resultant clusters. For this purpose, each cluster is assumed to be a single article which a human reader will read separately and independently of each other article. Accordingly, the reading order is considered entirely separately, cluster by cluster.

Within each cluster, traditional reading order recognition techniques may be used, for example those described by J Allen in "*Maintaining knowledge about temporal intervals*". *Communications of the ACM*, 36(11):832-843. 1983. The reading order may be determined using the techniques disclosed in the applicant's U.S. patent application Ser. No. 10/964,094 (HP Ref. 200402381) filed on 13 Oct. 2004, Entitled, "System And Methods For Articles Extraction And Text Reading Order Identification". Both of these documents are incorporated by reference.

Figure 6:
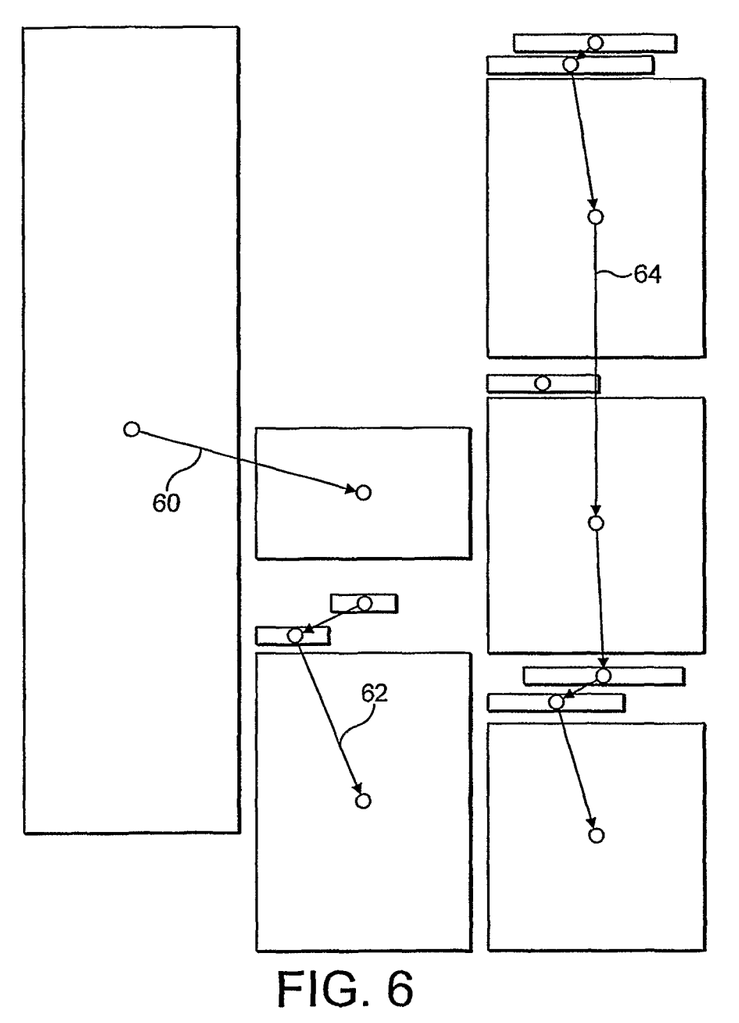
FIG. 6 illustrates the final output, showing the reading order within each of the identified clusters.

Once the reading order has been determined, we have a final result as schematically shown in FIG. 6. In this example, we have found three separate articles, the first having a reading order which is indicated by the arrow 60, the second having a reading order indicated by the arrows 62, and the third having a reading order indicated by the arrows 64.

In the embodiment described, no directional order is imposed upon the three articles that have been located, it being assumed that a human reader will wish to read those separately and independently. Of course, should it be convenient in any particular application, further processing could if desired be used to link the articles in order, to indicate that a human reader may typically read according to the arrow 60 first, then the arrows 62, and finally the arrows 64. Such an ordering can be determined using conventional reading order techniques, for example by considering the placement on the page of the first block of text within each article.

The embodiment described above may be used in conjunction with any one or more of the optional refinement steps, described below. Those refinements aim to improve the clustering algorithms, and take place immediately after completion of the clustering algorithms described above.

In a first refinement, the zones that do not belong to any cluster are, in an additional step, assigned to one of the existing clusters based on layout proximity. This ensures that every zone is allocated to a cluster even if, during the initial clustering procedure, the particular zone has been ignored because its correlation with every single other zone is below the cut off value. Layout proximity may include measures such as distance from the nearest zone of an existing cluster, physical relation on the page to existing zones and/or clusters and so on.

In a second refinement, once clusters have been determined using the method described above, clusters having interleaving zones are then grouped together to form a new cluster. In this context, "interleaving zones" means zones which are interleaved in the layout flow of the page. The layout flow in the specific example described above proceeds down the first column, and then down the second column, and finally down the third column.

In the third refinement, a cluster may be split if a zone from another cluster interrupts the layout flow. To take an example: suppose we have a page with ten text zones, with the layout flow passing from 1 to 10 in that order. Suppose also that we have identified two separate clusters, namely (5 9 10) and (1 2 3 4 6 7 8). It will be evident that the first cluster interrupts the second at zone 5, so we split the second cluster at that point, thereby ending up with the three final clusters (5 9 10), (1 2 3 4), and (6 7 8).

It will be understood of course, that the method of the present invention will typically be embodied within a computer program consisting of executable instructions stored on computer readable media such as memory or other types of storage device.

The invention claimed is:

1. A method of finding a text reading order in a document, the method comprising, with a processor executing instructions from a memory:
    determining a plurality of text zones within the document;
    for each text zone, generating a semantic measure of text within the text zone; and
    calculating a plurality of pairwise correlations between respective zone pairs;
    clustering the plurality of text zones into a plurality of clusters in dependence upon the plurality of pairwise correlations; and
    determining a separate reading order for the plurality of text zones within each respective cluster.

2. The method of claim 1, wherein the semantic measure is multi-valued, and a first pairwise correlation of the plurality of pairwise correlations is determined in dependence upon a combined similarity of respective values between a first text zone of each pair and a second text zone.

3. The method of claim 1, wherein the plurality of clusters are determined by:
    (a) selecting an initial text zone of the plurality of text zones as the start of a first cluster of the plurality of clusters;
    (b) adding to the first cluster any of the plurality of text zones which has a first pairwise correlation of the plurality of pairwise correlations of greater than a cut-off value with a second text zone already in the first cluster;
    (c) repeating (b) until no further text zones are added to the first cluster; and
    (d) repeating (a) to (c) until there are no more clusters to create.

4. The method of claim 3, wherein the cut-off value is user selectable.

5. The method of claim 1, further comprising, after the clustering, assigning to an existing cluster any text zone which has not already been assigned to a cluster by the clustering.

6. The method of claim 5, wherein a non-clustered zone is assigned to an existing cluster based on layout proximity.

7. The method of claim 1, further comprising determining whether any two clusters have interleaving zones, and if so merging the two clusters.

8. The method of claim 1, further comprising determining whether the text zones of a given cluster, considered in order of layout flow, are interrupted by one or more text zones of another cluster, and if so splitting the given cluster at a point of interruption.

9. The method of claim 1, further comprising, after the generating, excluding unwanted text zones from consideration in dependence upon their respective semantic measures.

10. A computer program comprising a series of computer-operable instructions recorded on a non-transitory computer-readable medium that, when executed by a processor, cause the processor to perform:
    determining a plurality of text zones within a document;
    for each text zone, generating a semantic measure of text within the text zone; and
    calculating a plurality of pairwise correlations between respective zone pairs;
    clustering the plurality of text zones into a plurality of clusters in dependence upon the plurality of pairwise correlations; and
    determining a separate reading order for the plurality of text zones within each respective cluster.

11. A method of finding a text reading order in a document that has been rendered into electronic form, the method comprising, with a computing system:
    for each of a plurality of text zones within the document, generating a semantic measure of text within that text zone;
    calculating a correlation factor for each of a number of pairs of zones from within the plurality of text zones, the correlation factor being based on the semantic measure for each text zone in a zone pair;
    clustering the plurality of text zones into a plurality of clusters by comparing the correlation factor generated for the number of pairs of zones to a minimum threshold; and
    determining a separate reading order for the plurality of text zones within each of the respective clusters.

12. The method of claim 11, wherein the semantic measure is based on any of a number of characters, a number of strings, a number of spaces, an average word length, a presence of particular words, an absence of particular words, classes or words, a type of punctuation and a density of punctuation.

13. The method of claim 11, further comprising discarding a number of the text zones prior to the clustering based on the semantic measure.

14. The method of claim 11, further comprising, for a first text zone of the plurality of text zones not assigned to any plurality of clusters by the clustering, assigning the first text zone to a first cluster of the plurality of clusters based on layout proximity.

15. The method of claim 11, further comprising, after the clustering, merging two clusters into a single cluster if the two clusters have interleaving zones.

16. The method of claim 11, further comprising, after the clustering, splitting a first cluster of the plurality of clusters into two separate clusters if a first text zone from a second cluster of the plurality of clusters interrupts the layout flow of the first cluster.

17. A non-transitory computer-readable memory having a computer program stored thereon to determine a text reading order within an electronically rendered document, that when executed by a processor of a computer causes the computer to:
    for each of a plurality of text zones in the document, generate a semantic measure of text within the text zone;
    calculate a correlation factor for pairs of zones from within the plurality of text zones, the correlation factor being based on the semantic measure for each text zone in the zone pair;
    cluster the plurality of text zones into a plurality of clusters by comparing the correlation factors generated for the pairs of zones to a minimum threshold; and
    determine a separate reading order for the plurality of text zones within each of the respective clusters.

* * * * *

UNITED STATES PATENT AND TRADEMARK OFFICE
CERTIFICATE OF CORRECTION

| | |
|---|---|
| PATENT NO. | : 9,098,581 B2 |
| APPLICATION NO. | : 11/995650 |
| DATED | : August 4, 2015 |
| INVENTOR(S) | : Sherif Yacoub et al. |

It is certified that error appears in the above-identified patent and that said Letters Patent is hereby corrected as shown below:

On the title page, in item (54), and in the specification, column 1, lines 1-2, Title, delete "METHOD FOR FINDING TEXT READING ORDER IN A DOCUMENT" and insert -- TEXT READING ORDER IN A DOCUMENT --, therefor.

Claims

In column 6, line 36, in Claim 14, delete "plurality" and insert -- of the plurality --, therefor.

Signed and Sealed this
Twenty-first Day of June, 2016

Michelle K. Lee
*Director of the United States Patent and Trademark Office*